United States Patent [19]

Anderson et al.

[11] Patent Number: 5,050,953
[45] Date of Patent: Sep. 24, 1991

[54] MULTI-PATH OPTICAL FIBER AND ELECTRO-OPTIC TRANSDUCER CONNECTOR

[75] Inventors: Keith D. Anderson, Nepean; Douglas S. Burbidge, Ottawa, both of Canada

[73] Assignee: Northern Telecom Limited, Montreal, Canada

[21] Appl. No.: 582,464

[22] Filed: Sep. 14, 1990

[51] Int. Cl.⁵ .............................. G02B 6/32; H01J 5/16
[52] U.S. Cl. ................................. 385/89; 250/227.11; 385/93; 385/33; 359/652
[58] Field of Search ............... 350/96.15, 96.16, 96.17, 350/96.18, 96.20, 96.22, 413; 370/1, 3; 250/227.11

[56] References Cited

U.S. PATENT DOCUMENTS

| | | | |
|---|---|---|---|
| 3,950,075 | 4/1976 | Cook et al. | 350/96.22 |
| 4,060,309 | 11/1977 | Le Noane et al. | 350/96.18 X |
| 4,707,066 | 11/1987 | Falkenstein et al. | 350/96.20 |
| 4,707,067 | 11/1987 | Haberland et al. | 350/96.20 |
| 4,749,250 | 6/1988 | Carter | 350/96.20 |
| 4,932,742 | 6/1990 | Tohme | 350/96.18 |
| 4,984,864 | 1/1991 | Blyler, Jr. et al. | 350/96.16 |
| 4,989,940 | 2/1991 | Wollenweber et al. | 350/96.18 |
| 4,997,254 | 3/1991 | Ganev | 350/96.20 |

Primary Examiner—Brian Healy
Attorney, Agent, or Firm—R. John Haley

[57] ABSTRACT

A multiple path electro-optic transducer comprises a plurality of electro-optic elements arranged in an array in a device package with electrical connections thereto. A lens tube having a lens, such as a graded index (GRIN) lens, therein is supported so that an axis of the lens is perpendicular to and aligned with the array and so that the array is imaged by the lens in a plane of an outer end of the lens tube. An optical fiber connector comprises a ferrule having a bore therein and a plurality of optical fibers extending through the bore in an array corresponding to the array of electro-optic elements, the ferrule and fibers being positioned, by a cylindrical sleeve over the lens tube and ferrule, so that ends of the fibers lie in the plane of the outer end of the lens tube whereby light emitted by each of the electro-optic element is focused by the lens onto a respective one of the fibers. A mechanical coupling is provided by a bayonet connection between the optical fiber connector and the device package.

20 Claims, 2 Drawing Sheets

MULTI-PATH OPTICAL FIBER AND ELECTRO-OPTIC TRANSDUCER CONNECTOR

This invention relates to a multi-path electro-optic transducer.

BACKGROUND OF THE INVENTION

It is well known to communicate signals via optical fibers, to which end it is known to convert a signal between electrical and optical forms using an electro-optic device, such as a light-emitting diode for an optical transmitter or a photodiode for a light receiver. In order to couple light effectively between the electro-optic device and an optical fiber, it is known to use a lens such as a graded index (GRIN) lens as a focusing element between the device and the end of the fiber.

Especially in the field of telecommunications, increasing capacity and density of electronic components have resulted in an increasing need for many optical fibers to be coupled to a single electronic circuit card. For example, in the case of optical line interface circuits for telecommunications switching equipment, several interface circuits, comprising optical transmitters and receivers, may be accommodated on a single card. In order to communicate the optical signals, a respective optical fiber must be accurately coupled to and aligned with each optical device. In addition to the difficulty of accommodating the required number of optical fiber connectors within the available physical space, the necessary alignment of the fibers to the devices is a labour-intensive and consequently expensive task.

Although each such fiber may carry signals at only a relatively low bit rate, for example of the order of 50 Mb/s, multiplexing of signals on the fibers, thereby to reduce the number of fibers and corresponding connectors needed, is not practical because the fibers may be coupled at their far ends to equipment which operates at this relatively low bit rate, or different fibers may extend to different locations.

Accordingly, a need exists to facilitate the coupling of fibers to electro-optic devices in a manner which provides a compact arrangement and facilitates alignment. An object of this invention is to provide a multi-path electro-optic transducer which satisfies this need.

SUMMARY OF THE INVENTION

According to one aspect of this invention there is provided an electro-optic transducer comprising: an electro-optic device comprising a plurality of electro-optic elements arranged in an array; a lens; and means supporting the lens with an axis perpendicular to and aligned with the array, the supporting means having an outer end perpendicular to the axis; the arrangement being such that the array and the outer end are in mutual object and image planes of the lens.

According to another aspect this invention provides an electro-optic transducer comprising: an electro-optic device package including an electro-optic device comprising a plurality of electro-optic elements arranged in an array, and electrical connections to the electro-optic elements; a lens tube having a lens therein; and means supporting the lens tube so that an axis of the lens is perpendicular to and aligned with the array and so that the array is imaged by the lens in a plane of an outer end of the lens tube.

In each of the above aspects of the invention, the lens conveniently comprises a graded index (GRIN) lens.

Thus light is focused by the lens between the electro-optic elements in the array and the plane of the outer end of the lens tube. A corresponding array of optical fibers ending in this plane can be conveniently provided using a common optical fiber connector, so that a single connector is used to achieve simultaneous coupling of a plurality of electro-optic elements and associated optical fibers. Consequently, space requirements are reduced and alignment is considerably expedited.

The device package can comprise a hermetically sealed package having an optically transparent front face through which light focused by the lens passes, or it can comprise an open front face through which light focused by the lens passes, hermetic sealing being provided via the lens, the lens tube, and the means supporting the lens tube.

In order to align a ferrule of an optical fiber connector, and hence optical fibers therein, with respect to the optical axis of the lens, preferably a cylindrical sleeve surrounds the lens tube and extends forwardly of the outer end of the lens tube for receiving the ferrule therein. For mechanical coupling of the optical fiber connector, the transducer preferably includes a coupling member surrounding and spaced from the cylindrical sleeve, the coupling member being supported by the means supporting the lens tube. The coupling member preferably includes rotational alignment means, such as a longitudinal slot, having a predetermined angular orientation with respect to the electro-optic elements of the array.

The invention also provides a transducer as recited above and including an optical fiber connector coupled thereto, the connector comprising a ferrule having a bore therein and a plurality of optical fibers extending through the bore in an array corresponding to the array of electro-optic elements, the ferrule and fibers being positioned so that ends of the fibers lie in the plane of the outer end of the lens tube whereby light emitted by each of the electro-optic elements is focused by the lens onto a respective one of the fibers (and conversely light received via each fiber is focused onto a respective electro-optic element).

The ferrule preferably has the same outside diameter as the lens tube, so that the cylindrical sleeve referred to above receives and precisely aligns the ferrule.

The transducer preferably includes complementary coupling members on the optical fiber connector and on the means supporting the lens tube, the coupling members surrounding and being spaced from the cylindrical sleeve and mechanically coupling the optical fiber connector to the device package. Each of the complementary coupling members can include rotational alignment means, such as a pin and a slot, having predetermined angular orientations with respect to the arrays of electro-optic elements and optical fibers.

There may conveniently be four optical fibers arranged in a square array, or more optical fibers arranged in a hexagonal array or in a circular array around a central spacer. In any event, the bore in the ferrule is sized to accommodate the fibers and any spacers precisely, so that their positions are accurately determined to facilitate the alignment process.

BRIEF DESCRIPTION OF THE DRAWINGS

The invention will be further understood from the following description with reference to the accompanying drawings, in which similar references are used in different figures to denote similar components and in which:

Referring to FIG. 1, there is illustrated a multi-path electro-optic transducer 10 comprising an electro-optic device package 12, a package cover 14, a cylindrical lens tube 16, and a cylindrical graded index (GRIN) lens 18. The package 12 comprises an electro-optic device 20 within a ceramic body 22 having an open metallized face 24, a metallized base 26, and external connection leads 28 to which the device 20 is connected via internal wires 30.

The device 20 comprises a single chip on which there is fabricated an array of surface-emitting LEDs (light emitting diodes) or PIN diodes to constitute optical transmitters or receivers respectively. The geometry of this array is matched to that of optical fibers for coupling to the electro-optic elements in the array as described further below. By way of example, however, FIG. 3 illustrates the face of the device 20 as comprising four LEDs or PIN diodes 32 arranged in a square array, corresponding to an arrangement of four optical fibers as shown in FIG. 4 and as described further below.

Figure 1:
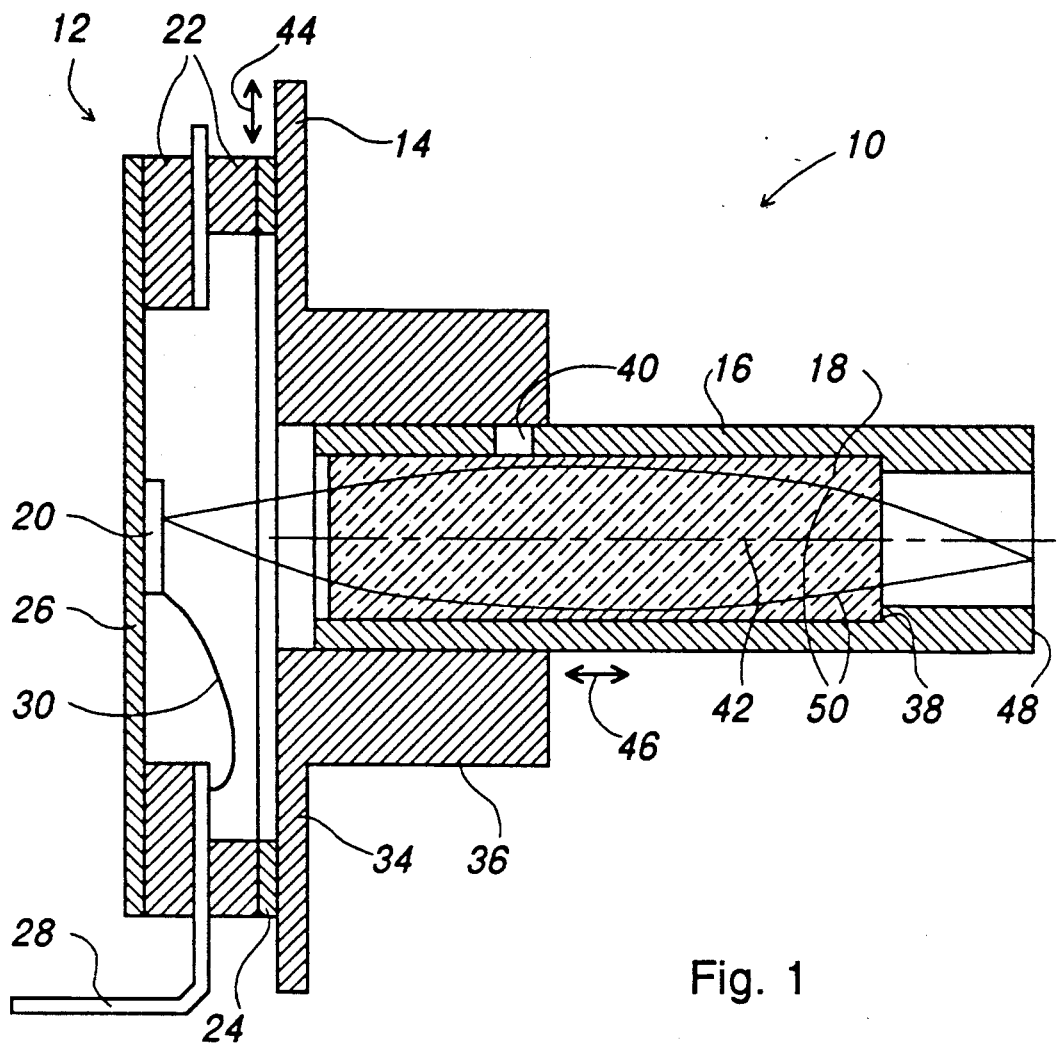
FIG. 1 is a cross-sectional diagram illustrating a multi-path electro-optic transducer in accordance with an embodiment of this invention.

Referring again to FIG. 1, the package cover 14 comprises a metal plate 34 having centrally therein a cylindrical boss 36 whose inner diameter corresponds to the outer diameter of the lens tube 16. The tube 16 is a brass tube having a precise length, with a forward internal abutment 38 against which the GRIN lens 18 is positioned. The lens 18 is secured within the tube 16 with epoxy, or by metallization and soldering to provide a hermetic seal, a hole 40 in the tube 16 serving to admit the epoxy or solder. The tube 16 is secured axially within the boss 36, when its axial position has been correctly adjusted as described below, with epoxy or solder to provide a hermetic seal.

Figure 3:
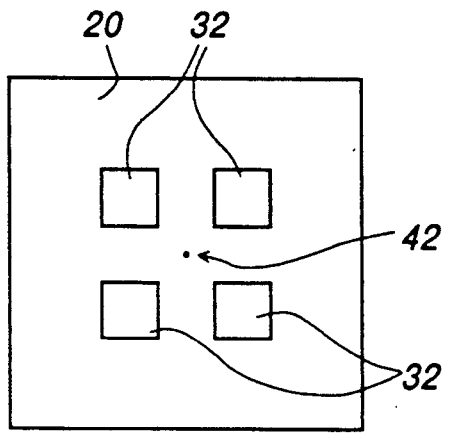
FIG. 3 illustrates an array of electro-optic elements used in the transducer.

The boss 36, tube 16, and lens 18 are concentric with one another about an axis 42 whose projection intersects the center of the array of electro-optic elements 32, as shown by a central dot referenced 42 in FIG. 3. This alignement is achieved in the manner described below by movement of the package cover 14 relative to the device package 12 vertically, as shown by a double-ended arrow 44 in FIG. 1, and laterally, i.e. in a direction perpendicular to the plane of FIG. 1.

The axial positioning of the tube 16 within the boss 36, shown by a double-ended arrow 46 in FIG. 1, and the characteristics of the GRIN lens 18 and the precise length of the tube 16, are such that the face of the electro-optic device 20 and the plane of a forward end 48 of the lens tube 16 are mutual object and (real) image planes of the lens 18. In other words, light emitted by a LED 32 of the device 20 is focused by the lens 18 in the plane of the tube end 48, and conversely light arriving at this tube end 48 is focused by the lens 18 at the face of the device 20 and hence in the plane of photodiodes 32 thereon. Lines 50 in FIG. 1 represent these focused light paths through the lens 18.

Figure 2:
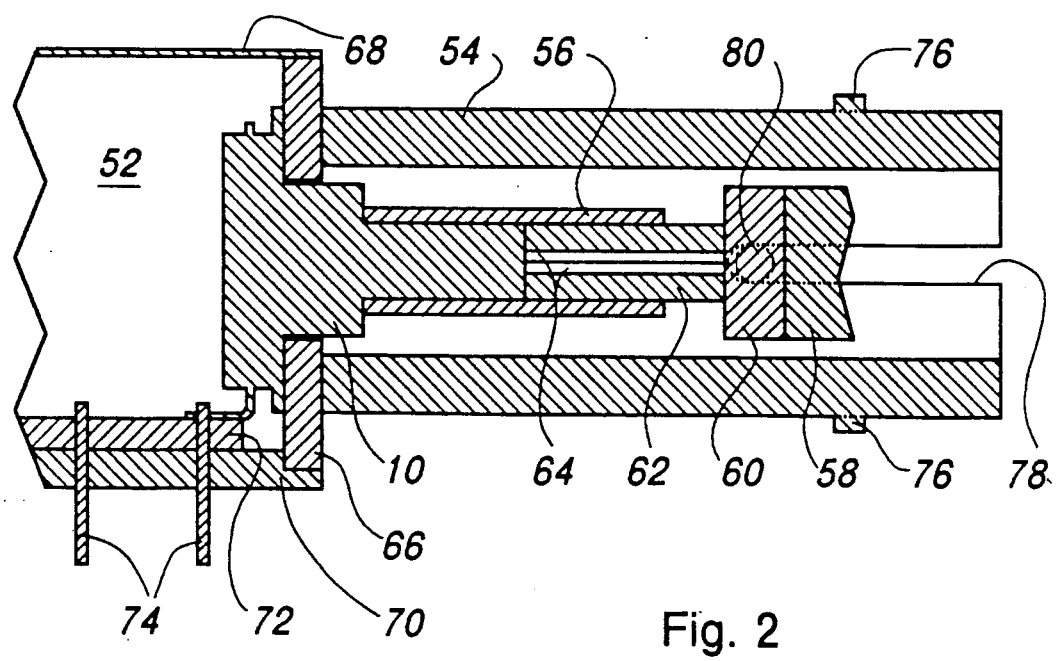
FIG. 2 is a cross-sectional diagram illustrating the transducer of FIG. 1 in association with a package and optical fiber coupling components.

Referring now to FIG. 2, the transducer 10 is shown outlined in association with a transducer package 52 and optical fiber coupling components. These components comprise a bayonet receptacle 54, a split cylindrical sleeve 56, and an optical fiber connector only some parts of which are shown, namely a body 58, a rotational alignment collar 60, a ceramic ferrule 62, and optical fibers 64.

The package 52 has a metal front face 66 to which the lid 14 of the transducer 10 is soldered and through a hole in which the boss 36 protrudes. The package 52 includes a lid 68 and a base 70, and contains a circuit board 72 to which the transducer leads 28 are connected and from which connection pins 74 extend through the base 70. Electronic components (not shown) associated with the electro-optic elements of the device 20 are mounted on the board 72 within the package 52.

The bayonet receptacle 54, after rotational alignment as described below, is soldered to the front face 66 of the package 52 concentrically with the axis 42 (not shown in FIG. 2). Except for its rotational alignement, the positioning of the bayonet receptacle 54 need not be particularly precise because it serves only for mechanical coupling and positioning errors are accommodated by play in the optical fiber connector. Bayonet pins 76 extend outwardly diametrically opposite one another near a forward end of the receptacle, and a rotational alignment slot 78 extends along part of the length of the receptacle 54 from this forward end.

The optical fiber connector is of a generally known form referred to as an ST connector, and in addition to the parts shown in FIG. 2 comprises a bayonet connector (not shown) which fits over the bayonet receptacle 54 and engages the bayonet pins 76 to provide a mechanical coupling. The ferrule 62 has an outside diameter which is the same as that of the lens tube 16, and is precisely aligned coaxially therewith by engagement within the split sleeve 56, which is positioned over the lens tube 16 and may be soldered thereto. The internal diameter of the split sleeve 56 in this position corresponds to the outside diameter of the lens tube 16 and of the ferrule 62. The ferrule 62 has a planar end to which the fibers 64 extend and which abuts the end 48 of the lens tube 16, so that the ends of the fibers 64 are in the object/image plane of the lens 18 discussed above.

The rotational alignment collar 60, which includes an outwardly projecting pin 80 which serves to engage the slot 78 for rotational alignment, surrounds the ferrule 62 adjacent the body 58 of the optical fiber connector, to which the ferrule 62 is attached. After rotational alignment as described below, the angular or rotational position of the collar 60 with respect to the fibers 64 is fixed by securing the collar 60 to the body 58 with epoxy or solder.

Figure 4:
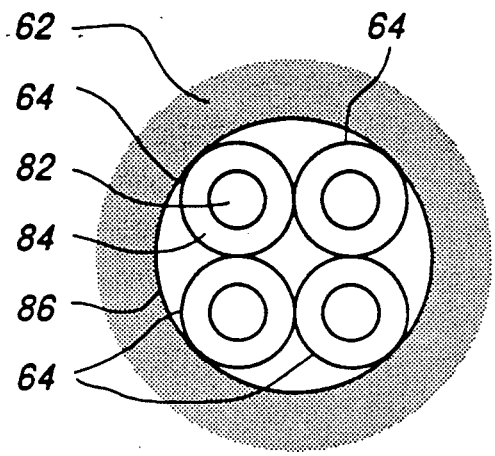
FIG. 4 illustrates an arrangement of optical fibers complementary to the array of FIG. 3.

Referring now to FIG. 4, there is illustrated an end view of the fibers 64 within the ferrule 62, and hence a view of the array of fibers in the object/image plane of the lens 18. As already mentioned above, this fiber array is complementary to the array of electro-optic elements 32 of the chip 20 as shown in FIG. 3, so that light is focused by the lens 18 in multiple paths between each of the electro-optic elements and a respective one of the fibers 64.

As illustrated in FIG. 4, each of the fibers 64 is a multi-mode optical fiber having a central core 82 and an outer cladding 84. The four fibers 64 are arranged in a square array within a precise central bore 86 of the ferrule 62. The bore 86 has a diameter D which is just sufficient to accommodate the four fibers; thus $D=(1\sqrt{2})d$ where d is the diameter of each of the fibers 64. For example, $d=125$ μm and $D=301.78$ μm. Consequently, the relative positions of the four fibers 64 in the array are precisely determined, and only their rotational position with respect to the ferrule 62 can vary.

As the positions of the electro-optic elements 32 on the face of the device 20 as shown in FIG. 3 are determined photolithographically, these are also precisely determined. Accordingly, these positions are determined by the pattern and relative positions of the fibers 64 within the ferrule 62, taking into account any magnification which is produced by the lens 18 as determined by the precise length of the lens tube 16. For example, with unity magnification (equal distances from the lens 18 to the image and object planes) as is assumed here and as illustrated in FIG. 1, the electro-optic elements 32 in FIG. 3 have a center-to-center spacing equal to the fiber diameter d (125 μm in the above example).

In order to effect the alignments referred to above, a video camera is optically coupled to the transducer 10 via a microscope lens which is focused onto the plane of the end 48 of the lens tube 16 and which is mechanically positioned, in the same manner as described above for the ferrule 62, by the split sleeve 56. The electro-optic elements 32 are then driven to emit light (optical receiver photodiodes can be driven in reverse to achieve this) which is imaged on a television screen coupled to the video camera. The lens tube 16 is then moved (arrow 46) relative to the boss 36 to focus the image, and the package 12 is moved vertically (arrow 44) and laterally (perpendicular to the plane of FIG. 1) to center the image, whereby the electro-optic elements 32 of the device 20 are centered with respect to the lens axis 42. After these adjustments, the package 12, lid 14, and lens tube 16 are secured in their relative positions and hermetically sealed as already explained.

In order to effect rotational alignment, a similar video camera and imaging procedure is followed after the transducer 10 is mounted within the package 52. In this case the relative rotational position of the video camera is determined by engagement with the slot 78 of the bayonet receptacle 54, and the package 52 is rotated relative to the receptacle 54 in order to rotationally align the television image with respect to a graticule or other indicia on the television screen. The bayonet receptacle 54 is then soldered to the lid 14 as already described.

A complementary coupling arrangement is used in a similar manner in order to rotationally align the pin 80 of the collar 60 of the fiber connector with respect to the orientation of the array of fibers 64. Such separate and individual rotational alignments of the transducer and the fiber connector result in the slot 78 and the pin 80 having predetermined angular orientations with respect to the arrays of electro-optic elements 32 and optical fibers 64 respectively. Hence it is ensured that connectors and transducers can be interchanged while still maintaining proper alignment of the fibers 64 to the electro-optic elements 32.

It should be appreciated that these alignments can be effected in a relatively easy manner, and furthermore simultaneously achieve alignment of multiple (in this example four) fibers 64 to respective elements 32. Accordingly, the labour costs associated with the alignment are considerably reduced in comparison to the prior art. In addition, the coupling of multiple fibers 64 using a common connector results in savings in space and connector costs, and does not involve any change in the signals communicated via the fibers. The fibers 64 can be separated from one another remotely from the transducer 10 to be routed to different destinations, or they can be kept together to be routed to a common destination.

Figure 5:
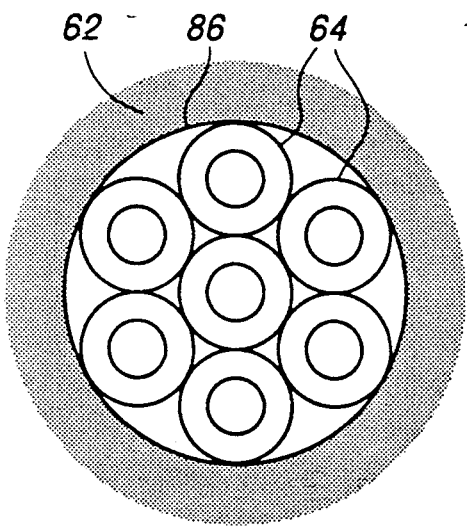
FIGS. 5 and 6 illustrate alternative optical fiber arrangements.
Figure 6:
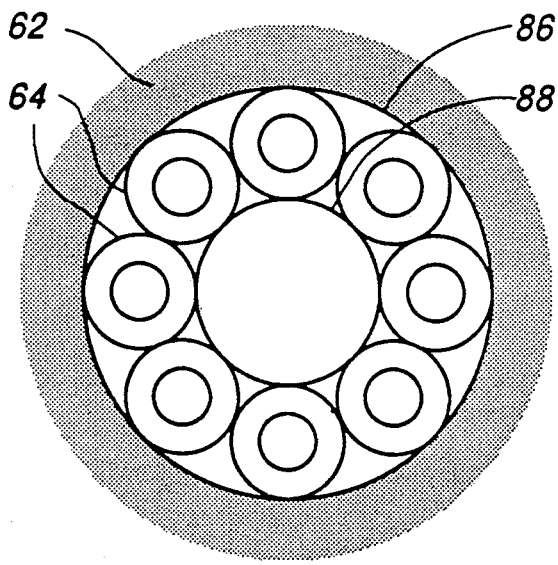

FIGS. 5 and 6 illustrate alternative fiber arrays which may be conveniently used instead of the array of FIG. 4, in each case with a complementary array of electro-optic elements 32 instead of the square array in FIG. 3. In FIG. 5, seven fibers 64 are arranged in a close-packed array of one central fiber and six surrounding fibers. As in the case of FIG. 4, the bore 86 of the ferrule 62 is just sufficient (3d in this case) to accommodate the fibers, so that they are positioned precisely with respect to one another and only their overall rotational position is variable. In FIG. 6, eight fibers 64 are arranged around a central cylindrical spacer 88, which is of a precise diameter to constrain the fibers 64 against the bore 86 of the ferrule 62, so that again only the overall rotational position of the fibers is variable. In this case the spacer 88 has a diameter of 1.61d and the bore 86 of the ferrule 62 has a diameter of 3.61d.

It should be appreciated that the alternative fiber arrays in FIGS. 4, 5, and 6 do not require a different fiber connector arrangement, but merely require an appropriate diameter of bore 86 to be provided in the ferrule 62 to accommodate the respective number and arrangement of fibers. Other arrays of fibers 64 can similarly be provided, with or without spacers such as the central spacer 88, and in each case all of the fibers, or only some of them to reduce crosstalk, may be used. In this respect, however, it is observed that no significant crosstalk problems have arisen in practice using all of the fibers in the array of FIG. 4. It is also noted that no significant problems have been observed in practice resulting from the non-axial multiple light paths through the GRIN lens 18 between each electro-optic element 32 and the associated fiber 64.

Although the embodiments of the invention described above use a GRIN lens 18, this being particularly convenient, it should be appreciated that the invention is not limited in this respect and that any other suitable form of lens may be used. For example, instead of the GRIN lens a conventional convex lens may be provided within the tube 16, such lens having the same optical axis 42 and focusing between the plane of the array of electro-optic elements and the plane of the forward end 48 of the lens tube 16 in the same manner as described above for the GRIN lens 18.

In describing the above arrangements, it has been assumed that the device package 12 is not hermetically sealed, and that a hermetic seal must be provided externally of this via the lid 14, lens tube 16, and lens 18. Alternatively, however, it should be appreciated that the package 12 could itself be hermetically sealed by providing the face 24 of an optically transparent material, e.g. glass, through which the multiple light paths are focused by the lens 18.

Numerous other modifications, variations, and adaptations may be made to the described embodiments without departing from the scope of the invention as defined in the claims.

What is claimed is:

1. An electro-optic transducer comprising:

an electro-optic device (20) comprising a plurality of electro-optic elements (32) arranged in an array;

a lens (18);

means (16) supporting the lens with an axis (42) perpendicular to and aligned with the array, the supporting means having an outer end (48) perpendicular to the axis;

the arrangement being such that the array and the outer end are in mutual object and image planes of the lens; and an optical fiber connector comprising a ferrule (62) having a bore (86) therein and a plurality of optical fibers (64) extending through the bore in an array corresponding to the array of electro-optic elements, the ferrule and fibers being positioned so that ends of the fibers lie in the plane of the outer end of the lens tube whereby light emitted by each of the electro-optic elements is focused by the lens onto a respective one of the fibers.

2. A transducer as claimed in claim 1 wherein the lens comprises a graded index lens (18).

3. An electro-optic transducer comprising:

an electro-optic device package (12) including an electro-optic device (20) comprising a plurality of electro-optic elements (32) arranged in an array, and electrical connections (28, 30) to the electro-optic elements;

a lens tube (16) having a lens (18) therein; and means (14) supporting the lens tube so that an axis (42) of the lens is perpendicular to and aligned with the array and so that the array is imaged by the lens in a plane of an outer end of the lens tube.

4. A transducer as claimed in claim 3 wherein the device package comprises a hermetically sealed package having an optically transparent front face through which light focused by the lens passes.

5. A transducer as claimed in claim 3 wherein the device package comprises an open front face through which light focused by the lens passes.

6. A transducer as claimed in claim 5 wherein the device package is hermetically sealed via the lens, the lens tube, and the means supporting the lens tube.

7. An electro-optic transducer comprising:

an electro-optic device package (12) including an electro-optic device (20) comprising a plurality of electro-optic elements (32) arranged in an array, and electrical connections (28, 30) to the electro-optic elements;

a lens tube (16) having a lens (18) therein;

means (14) supporting the lens tube so that an axis (42) of the lens is perpendicular to and aligned with the array and so that the array is imaged by the lens in a plane of an outer end of the lens tube; and a cylindrical sleeve (56) surrounding the lens tube and extending forwardly of the outer end of the lens tube for receiving therein and aligning a ferrule of an optical fiber connector.

8. A transducer as claimed in claim 7 and including a coupling member (54) surrounding and spaced from the cylindrical sleeve, the coupling member being supported by the means supporting the lens tube and serving for mechanical coupling of an optical fiber connector thereto.

9. A transducer as claimed in claim 8 wherein the coupling member includes rotational alignment means (78) having a predetermined angular orientation with respect to the electro-optic elements of the array.

10. A transducer as claimed in claim 8 wherein the coupling member comprises a bayonet coupler (76).

11. A transducer as claimed in claim 3 wherein the lens comprises a graded index lens (18).

12. An electro-optic transducer comprising:

an electro-optic device package (12) including an electro-optic device (20) comprising a plurality of electro-optic elements (32) arranged in an array, and electrical connections (28, 30) to the electro-optic elements;

a lens tube (16) having a lens (18) therein;

means (14) supporting the lens tube so that an axis (42) of the lens is perpendicular to and aligned with the array and so that the array is imaged by the lens in a plane of an outer end of the lens tube; and an optical fiber connector coupled thereto, the connector comprising a ferrule (62) having a bore (86) therein and a plurality of optical fibers (64) extending through the bore in an array corresponding to the array of electro-optic elements, the ferrule and fibers being positioned so that ends of the fibers lie in the plane of the outer end of the lens tube whereby light emitted by each of the electro-optic elements is focused by the lens onto a respective one of the fibers.

13. A transducer as claimed in claim 12 wherein the ferrule and the lens tube have the same outside diameter, the transducer further including a cylindrical sleeve (56) surrounding the lens tube and the ferrule to align the ferrule with the lens tube.

14. A transducer as claimed in claim 13 and including complementary coupling members on the optical fiber connector and on the means supporting the lens tube, the coupling members surrounding and being spaced from the cylindrical sleeve and mechanically coupling the optical fiber connector to the device package.

15. A transducer as claimed in claim 14 wherein each of the complementary coupling members includes rotational alignement means (78, 80) having predetermined angular orientations with respect to the arrays of electro-optic elements and optical fibers.

16. A transducer as claimed in claim 15 wherein the complementary coupling members comprise bayonet coupling means (76).

17. A transducer as claimed in claim 12 wherein there are four optical fibers arranged in a square array (FIG. 4).

18. A transducer as claimed in claim 12 wherein the optical fibers are arranged in a hexagonal array (FIG. 5).

19. A transducer as claimed in claim 12 wherein the optical fibers are arranged in a circular array around a central spacer (88, FIG. 6).

20. A transducer as claimed in claim 12 wherein the lens comprises a graded index lens (18).

* * * * *